United States Patent
Paatero

(10) Patent No.: US 11,863,014 B2
(45) Date of Patent: Jan. 2, 2024

(54) POWER SUPPLY ASSEMBLY

(71) Applicant: ABB Schweiz AG, Baden (CH)

(72) Inventor: Esa-Kai Paatero, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/651,371

(22) Filed: Feb. 16, 2022

(65) Prior Publication Data
US 2022/0271561 A1   Aug. 25, 2022

(30) Foreign Application Priority Data

Feb. 23, 2021   (EP) .................................. 21158618

(51) Int. Cl.
| | | |
|---|---|---|
| *H02J 9/06* | (2006.01) | |
| *H02J 7/00* | (2006.01) | |
| *H02M 3/335* | (2006.01) | |

(52) U.S. Cl.
CPC .............. *H02J 9/062* (2013.01); *H02J 7/007* (2013.01); *H02J 2207/20* (2020.01); *H02M 3/33523* (2013.01)

(58) Field of Classification Search
CPC .... H02J 9/062; H02J 9/06; H02J 9/068; H02J 9/061; G06F 1/263
See application file for complete search history.

(56) References Cited

U.S. PATENT DOCUMENTS

| | | | |
|---|---|---|---|
| 4,779,007 A | 10/1988 | Schlanger et al. | |
| 10,879,727 B1* | 12/2020 | Cooper | H02J 9/062 |
| 2017/0279287 A1* | 9/2017 | Solodovnik | H02J 7/04 |
| 2020/0014237 A1* | 1/2020 | Wu | H01M 10/44 |

FOREIGN PATENT DOCUMENTS

| | | |
|---|---|---|
| EP | 2899836 A1 | 7/2015 |
| EP | 3088989 A1 | 11/2016 |
| EP | 3447881 A1 | 2/2019 |
| WO | 2018234046 A1 | 12/2018 |

OTHER PUBLICATIONS

Khare, Sagar, and Mohammad Kamil. "Offline UPS Reference Design Using the dsPIC® DSC." Microchip Technology AN1279 (2009). (Year: 2009).*
European Search Report; Application No. EP 21 15 8618; dated Jul. 7, 2021; 2 Pages.

* cited by examiner

Primary Examiner — Ryan Johnson
(74) Attorney, Agent, or Firm — Whitmyer IP Group LLC

(57) ABSTRACT

A power supply assembly including an alternating current primary source connection, a direct current secondary source connection, an alternating current load connection, a DC link, a direct-current converter connected electrically between the secondary source connection and the DC link, and a load supply converter connected electrically between the DC link and the load connection. The power supply assembly includes a trickle charger converter connected electrically between at least one alternating current connection and the secondary source connection, a nominal power of the trickle charger converter being less than nominal powers of the direct-current converter and the load supply converter.

23 Claims, 1 Drawing Sheet

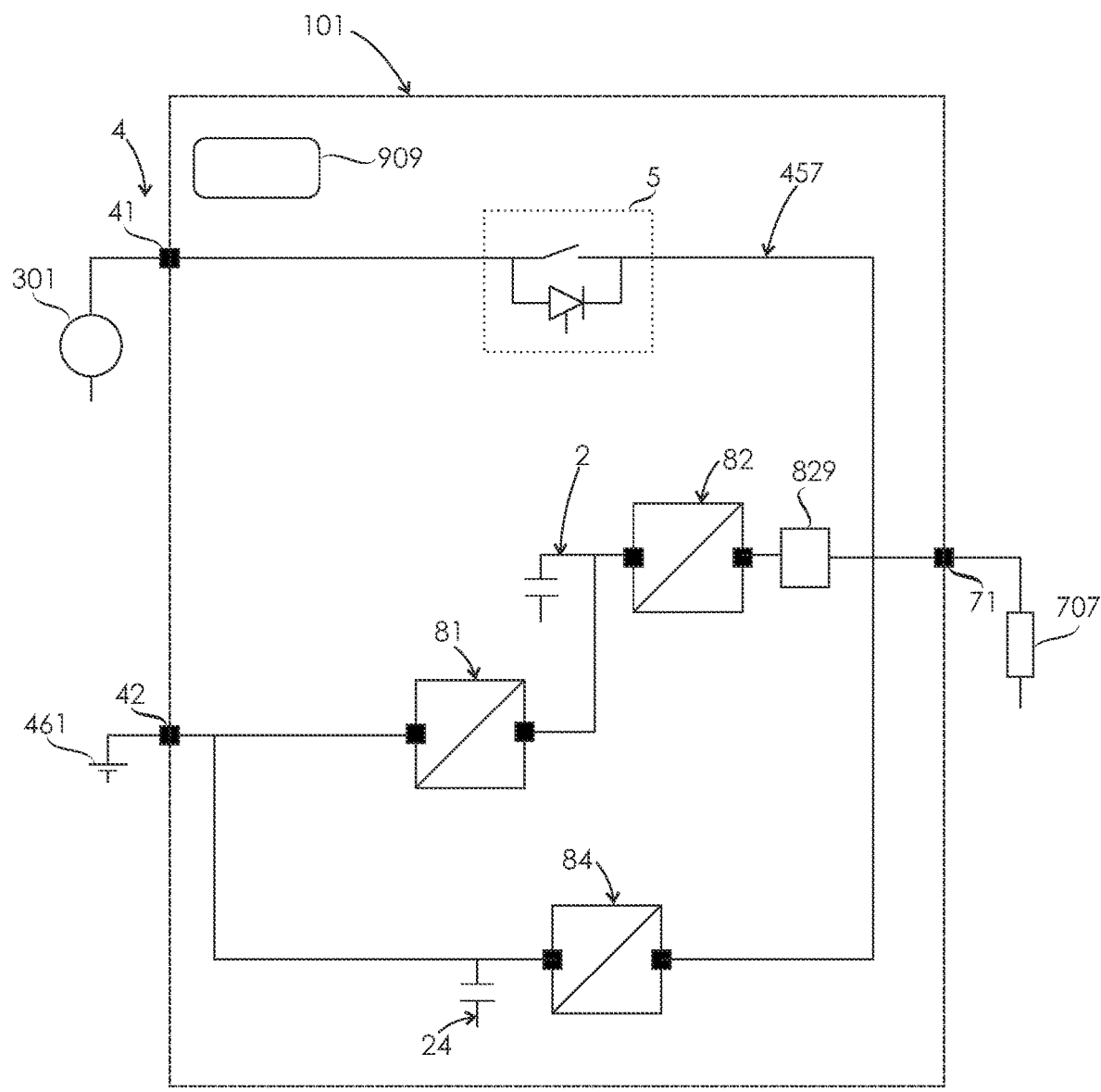

POWER SUPPLY ASSEMBLY

TECHNICAL FIELD

The present invention relates to a power supply assembly, and more particularly to an uninterruptible power supply assembly.

BACKGROUND

An uninterruptible power supply (UPS) is an electrical apparatus that provides emergency power to a load when a primary alternating current supply fails. A UPS differs from standby generator in that it is adapted to provide emergency power almost instantly after the primary alternating current supply fails. An uninterruptible power supply is adapted to supply energy stored for example in batteries, supercapacitors, or flywheels.

A known power supply assembly comprises a direct current supply, a DC link, an alternating current load connection, a direct-current converter, and a load supply converter, wherein the power supply assembly is adapted to supply power from the direct current supply to the alternating current load connection through the direct-current converter, the DC link and the load supply converter. Examples of known uninterruptible power supply assemblies are described in publications WO2018/234046 and EP3088989.

One of the disadvantages associated with the above power supply assembly is that both the direct-current converter and the load supply converter must be rated for the total power supplied from the direct current supply to the alternating current load connection, which means that a coefficient of efficiency during additional operations is relatively poor. Herein, additional operations comprise charging the direct current supply from the DC link through the direct-current converter, and compensating reactive-power at the alternating current load connection by the load supply converter. The coefficient of efficiency of the direct-current converter and the load supply converter is low during the additional operations since their loads during the additional operations are typically much lower than their nominal powers.

SUMMARY

An object of the present invention is to provide a power supply assembly so as to alleviate the above disadvantages. The objects of the invention are achieved by a power supply assembly described in the following.

The invention is based on the idea of providing a power supply assembly with a separate trickle charger converter adapted for charging the direct current supply. The trickle charger converter is connected electrically between an alternating current connection and the direct current supply, and a nominal power of the trickle charger converter is less than nominal powers of the direct-current converter and the load supply converter.

An advantage of the power supply assembly of the invention is a high coefficient of efficiency during a trickle charging operation in which the direct current supply is charged by means of the trickle charger converter. The energy efficiency is improved since during the trickle charging operation it is not required to supply power through the direct-current converter and the load supply converter, which have high nominal powers and relatively high losses at small partial loads.

Further, when the direct current supply is charged by means of the trickle charger converter, the charging power passes through only one converter, namely the trickle charger converter. If the direct current supply is charged from the alternating current load connection through the load supply converter and the direct-current converter, the charging power passes through two converters both having a high nominal power. Consequently, charging the direct current supply by means of the trickle charger converter is more energy efficient than charging the direct current supply by means of the load supply converter and the direct-current converter.

BRIEF DESCRIPTION OF THE DRAWINGS

In the following the invention will be described in greater detail by means of preferred embodiments with reference to the attached drawing, in which FIG. 1 shows a power supply assembly according to an embodiment of the invention.

DETAILED DESCRIPTION

FIG. 1 shows a power supply assembly 101 comprising a source connection system 4, a load connection 71, a DC link 2, a direct-current converter 81, a load supply converter 82, a trickle charger converter 84, a supply switch 5, a control system 909 and a rechargeable direct-current supply 461.

The source connection system 4 comprises a primary source connection 41 adapted to be connected electrically to a primary alternating current supply 301, and a secondary source connection 42 adapted to be connected electrically to a secondary current supply. The secondary source connection 42 is a direct current connection. The load connection 71 is adapted to be connected electrically to an alternating current load 707.

The direct-current converter 81 is connected electrically between the secondary source connection 42 and the DC link 2. The direct-current converter 81 is adapted to supply power from the secondary source connection 42 to the DC link 2. The DC link 2 comprises DC link capacitance.

The load supply converter 82 is connected electrically between the DC link 2 and the load connection 71. The load supply converter 82 is adapted to supply power from the DC link 2 to the load connection 71.

There is a supply converter filter 829 connected electrically between the load supply converter 82 and the load connection 71. The supply converter filter 829 comprises filter capacitance. Due to its relatively high capacitance, the supply converter filter 829 causes significant reactive power in the power supply assembly.

The trickle charger converter 84 is connected electrically between the load connection 71 and the secondary source connection 42. There is a trickle charger capacitor 24 connected electrically between the secondary source connection 42 and the trickle charger converter 84.

The trickle charger converter 84 is adapted to supply power from the load connection 71 to the secondary source connection 42. A nominal power of the trickle charger converter 84 is less than nominal powers of the direct-current converter 81 and the load supply converter 82.

A nominal power of the direct-current converter 81 is equal to a nominal power of the load supply converter 82. A nominal power of the trickle charger converter 84 is 5% of the nominal power of the direct-current converter 81. In an alternative embodiment, a nominal power of the trickle charger converter is less than or equal to 15% of the nominal power of the direct-current converter. In further alternative embodiments, the nominal power of the trickle charger converter is in a range of 1-10% of the nominal power of the direct-current converter. In yet further alternative embodiments, the nominal power of the trickle charger converter is in a range of 1-10% of the nominal power of the load supply converter.

There is an internal galvanic isolation between an alternating current side and a direct current side of the trickle charger converter. In an embodiment, the galvanic isolation is adapted to operate at the converter pulse width modulation frequency.

The trickle charger converter 84 has a different topology than the load supply converter 82, and it utilizes different type of semiconductor switches. The trickle charger converter 84 is based on a very low loss topology such as resonant topology. The trickle charger converter 84 is based on a soft switching topology. The trickle charger converter 84 utilizes large band gap semiconductors such as silicon carbide (SiC) or gallium nitride (GaN) semiconductors. The trickle charger converter 84 is designed for an optimal point of operation consistently maintained.

In an alternative embodiment, the trickle charger converter has an identical topology with the load supply converter, and they both utilize same type of semiconductor switches. It is even possible that the trickle charger converter and the load supply converter are, except for their nominal powers, identical with each other.

In alternative embodiments, the trickle charger converter is connected electrically between at least one alternating current connection and the secondary source connection, the trickle charger converter being adapted to supply power from the at least one alternating current connection to the at least one secondary source connection. Said at least one alternating current connection comprises at least one of the load connection and the primary source connection.

In an embodiment, the trickle charger converter, the direct-current converter, and the load supply converter are located inside a common housing. In an alternative embodiment, the trickle charger converter is located inside a different housing than the direct-current converter and the load supply converter.

In an alternative embodiment, the power supply assembly comprises a plurality of secondary source connections each adapted to be connected electrically to a different secondary current supply. The different secondary current supplies comprise direct current supplies of different types, such as a battery and a capacitor.

The primary source connection 41 is electrically conductively connected to the load connection 71 by means of alternating current supply route 457 for supplying power from the primary source connection 41 to the load connection 71. The supply switch 5 is adapted to disconnect the alternating current supply route 457 thereby disconnecting the primary source connection 41 from the load connection 71.

The control system 909 is adapted to control the direct-current converter 81, the load supply converter 82, the trickle charger converter 84 and the supply switch 5.

The control system 909 is adapted to provide an energy saver mode, a direct-current supply mode, a charging mode, a trickle charging mode, and a reactive power compensation mode for the power supply assembly.

In the energy saver mode, the supply switch 5 is in a conducting state for supplying power from the primary source connection 41 to the load connection 71. In an embodiment, the direct-current converter and the load supply converter are in stand by states during the energy saver mode. In an alternative embodiment, the direct-current converter and the load supply converter are in off state during the energy saver mode. Herein, a stand by state is a state in which semiconductor switches of a converter are currentless, and only control circuits of the converter consume little power.

In the direct-current supply mode, the supply switch 5 is in a non-conducting state, and power is supplied to the load connection 71 from the secondary source connection 42 through the direct-current converter 81 and the load supply converter 82. In an embodiment, also the trickle charger converter takes part in supplying power to the load connection during the direct-current supply mode. The participation of the trickle charger converter in supplying power to the load connection during the direct-current supply mode increases a total power that can be supplied to the load connection during the direct-current supply mode.

In the charging mode power is supplied to the secondary source connection 42 from the DC link 2 through the direct-current converter 81. In an embodiment, also the trickle charger converter takes part in supplying power to the secondary source connection during the charging mode.

In the trickle charging mode, power is supplied from the load connection 71 to the secondary source connection 42 exclusively through the trickle charger converter 84. No power is supplied to the secondary source connection 42 through the direct-current converter 81.

A power of the charging mode is higher than the nominal power of the trickle charger converter. The charging mode is adapted to replenish the rechargeable direct-current supply 461 fast in a situation where there is no time to slowly recharge the rechargeable direct-current supply 461 by the trickle charger converter 84.

In an embodiment, the direct-current converter is in an off state during the trickle charging mode. In an alternative embodiment, the direct-current converter is in a stand by state during the trickle charging mode.

In the reactive power compensation mode, reactive power is supplied from the trickle charger converter 84 to the load connection 71. In an embodiment, reactive power is supplied exclusively from the trickle charger converter to the load connection. In said embodiment, the trickle charger converter is capable of compensating at least portion of reactive power caused by the supply converter filter.

In an alternative embodiment, reactive power is supplied from both the trickle charger converter and the load supply converter to the load connection.

In the embodiment of FIG. 1, each of the direct-current converter 81, the load supply converter 82 and the trickle charger converter 84 are bidirectional converters. In an embodiment, in which the trickle charger converter does not take part in supplying power from the secondary source connection to the load connection, the trickle charger converter is a unidirectional converter. In another embodiment, in which no power is supplied from the load connection to the secondary source connection through the load supply converter and direct-current converter, the load supply converter and direct-current converter are unidirectional converters.

In the power supply assembly shown in FIG. 1, the trickle charger converter 84 consists of single unit. In an alternative embodiment, the trickle charger converter comprises a plurality of units connected in parallel. In a further alternative embodiment, the load supply converter comprises a plurality of units connected in parallel, and the direct-current converter comprises a plurality of units connected in parallel.

It will be obvious to a person skilled in the art that the inventive concept can be implemented in various ways. The invention and its embodiments are not limited to the examples described above but may vary within the scope of the claims.

The invention claimed is:

1. A power supply assembly comprising:
   a source connection system comprising a primary source connection adapted to be connected electrically to a primary alternating current supply, and at least one secondary source connection adapted to be connected electrically to a secondary current supply, the at least one secondary source connection being a direct current connection;
   a load connection adapted to be connected electrically to an alternating current load;
   a DC link;
   a direct-current converter connected electrically between the at least one secondary source connection and the DC link, the direct-current converter being adapted to supply power from the at least one secondary source connection to the DC link;
   a load supply converter connected electrically between the DC link and the load connection, the load supply converter being adapted to supply power from the DC link to the load connection; and
   a supply switch adapted to disconnect the primary source connection from the load connection,
   wherein the power supply assembly comprises a trickle charger converter connected electrically between at least one alternating current connection and the at least one secondary source connection, the trickle charger converter being adapted to supply power from the at least one alternating current connection to the at least one secondary source connection, and a nominal power of the trickle charger converter is less than nominal powers of the direct-current converter and the load supply converter,
   wherein the power supply assembly comprises a control system adapted to control the direct-current converter, the load supply converter, the trickle charger converter and the supply switch, and
   wherein the control system is adapted to provide a charging mode for the power supply assembly in which power is supplied to the at least one secondary source connection from the DC link through the direct-current converter.

2. The power supply assembly as claimed in claim 1, wherein the control system is adapted to provide an energy saver mode for the power supply assembly in which the supply switch is in a conducting state for supplying power from the primary source connection to the load connection, and a direct-current supply mode for the power supply assembly in which the supply switch is in a non-conducting state, and power is supplied to the load connection from the at least one secondary source connection through the direct-current converter and the load supply converter.

3. The power supply assembly as claimed in claim 1, wherein the control system is adapted to provide a trickle charging mode for the power supply assembly in which power is supplied from the at least one alternating current connection to the at least one secondary source connection through the trickle charger converter.

4. The power supply assembly as claimed in claim 1, wherein the control system is adapted to provide a reactive power compensation mode for the power supply assembly in which reactive power is supplied from the trickle charger converter to the at least one alternating current connection.

5. The power supply assembly as claimed in claim 1, wherein the at least one alternating current connection, to which an alternating current side of the trickle charger converter is connected, comprises at least one of the load connection and the primary source connection.

6. The power supply assembly as claimed in claim 1, wherein the nominal power of the trickle charger converter is less than or equal to 15% of the nominal power of the direct-current converter.

7. The power supply assembly as claimed in claim 6, wherein the nominal power of the trickle charger converter is in a range of 1-10% of the nominal power of the direct-current converter.

8. The power supply assembly as claimed in claim 1, wherein the power supply assembly comprises at least one rechargeable direct-current supply electrically connected to the at least one secondary source connection.

9. The power supply assembly as claimed in claim 1, wherein the trickle charger converter has a different topology than the load supply converter.

10. The power supply assembly as claimed in claim 1, wherein the trickle charger converter utilizes different type of semiconductor switches than the load supply converter.

11. The power supply assembly as claimed in claim 1, wherein there is an internal galvanic isolation between an alternating current side and a direct current side of the trickle charger converter.

12. The power supply assembly as claimed in claim 1, wherein the trickle charger converter utilizes large band gap semiconductors.

13. A power supply assembly comprising:
    a source connection system comprising a primary source connection adapted to be connected electrically to a primary alternating current supply, and at least one secondary source connection adapted to be connected electrically to a secondary current supply, the at least one secondary source connection being a direct current connection;
    a load connection adapted to be connected electrically to an alternating current load;
    a DC link;
    a direct-current converter connected electrically between the at least one secondary source connection and the DC link, the direct-current converter being adapted to supply power from the at least one secondary source connection to the DC link;
    a load supply converter connected electrically between the DC link and the load connection, the load supply converter being adapted to supply power from the DC link to the load connection; and
    a supply switch adapted to disconnect the primary source connection from the load connection,
    wherein the power supply assembly comprises a trickle charger converter connected electrically between at least one alternating current connection and the at least one secondary source connection, the trickle charger converter being adapted to supply power from the at least one alternating current connection to the at least one secondary source connection, and a nominal power of the trickle charger converter is less than nominal powers of the direct-current converter and the load supply converter,
    wherein the power supply assembly comprises a control system adapted to control the direct-current converter, the load supply converter, the trickle charger converter and the supply switch, and wherein the control system is adapted to provide a reactive power compensation mode for the power supply assembly in which reactive power is supplied from the trickle charger converter to the at least one alternating current connection.

14. The power supply assembly as claimed in claim 13, wherein the control system is adapted to provide an energy saver mode for the power supply assembly in which the supply switch is in a conducting state for supplying power from the primary source connection to the load connection, and a direct-current supply mode for the power supply assembly in which the supply switch is in a non-conducting state, and power is supplied to the load connection from the at least one secondary source connection through the direct-current converter and the load supply converter.

15. The power supply assembly as claimed in claim 13, wherein the control system is adapted to provide a trickle charging mode for the power supply assembly in which power is supplied from the at least one alternating current connection to the at least one secondary source connection through the trickle charger converter.

16. The power supply assembly as claimed in claim 13, wherein the at least one alternating current connection, to which an alternating current side of the trickle charger converter is connected, comprises at least one of the load connection and the primary source connection.

17. The power supply assembly as claimed in claim 13, wherein the nominal power of the trickle charger converter is less than or equal to 15% of the nominal power of the direct-current converter.

18. The power supply assembly as claimed in claim 17, wherein the nominal power of the trickle charger converter is in a range of 1-10% of the nominal power of the direct-current converter.

19. The power supply assembly as claimed in claim 13, wherein the power supply assembly comprises at least one rechargeable direct-current supply electrically connected to the at least one secondary source connection.

20. The power supply assembly as claimed in claim 13, wherein the trickle charger converter has a different topology than the load supply converter.

21. The power supply assembly as claimed in claim 13, wherein the trickle charger converter utilizes different type of semiconductor switches than the load supply converter.

22. The power supply assembly as claimed in claim 13, wherein there is an internal galvanic isolation between an alternating current side and a direct current side of the trickle charger converter.

23. The power supply assembly as claimed in claim 13, wherein the trickle charger converter utilizes large band gap semiconductors.

* * * * *